(12) United States Patent
Chien

(10) Patent No.: US 7,518,758 B2
(45) Date of Patent: Apr. 14, 2009

(54) METHOD AND APPARATUS FOR INCREASING SCANNING RESOLUTION

(76) Inventor: Hsing-Tang Chien, c/o Lite-On Technology Corporation, 10F, 25, Sec. 1, Tung Hua S. Road, Taipei (TW)

( * ) Notice: Subject to any disclaimer, the term of this patent is extended or adjusted under 35 U.S.C. 154(b) by 1082 days.

(21) Appl. No.: 10/299,823

(22) Filed: Nov. 20, 2002

(65) Prior Publication Data
US 2003/0128407 A1 Jul. 10, 2003

(30) Foreign Application Priority Data
Jan. 8, 2002 (TW) .............................. 91100160 A

(51) Int. Cl.
*H04N 1/04* (2006.01)

(52) U.S. Cl. ..................... 358/474; 358/475; 358/483; 358/487; 358/497

(58) Field of Classification Search ............ 235/472.01, 235/462.13; 348/42; 358/474, 487, 506, 358/497, 494, 482, 483, 505, 475, 509; 355/44, 355/45; 250/234–236, 216, 239
See application file for complete search history.

(56) References Cited

U.S. PATENT DOCUMENTS

| | | | | |
|---|---|---|---|---|
| 5,113,268 A | * | 5/1992 | Yoshida et al. | 358/474 |
| 5,335,093 A | * | 8/1994 | Imoto | 358/487 |
| 5,457,547 A | * | 10/1995 | Yamada | 358/487 |
| 6,170,751 B1 | * | 1/2001 | Tsai | 235/472.01 |
| 7,023,466 B2 | * | 4/2006 | Favalora et al. | 348/42 |

* cited by examiner

*Primary Examiner*—Cheukfan Lee
(74) *Attorney, Agent, or Firm*—Perkins Coie LLP

(57) ABSTRACT

The present invention provides a method and apparatus for increasing a scanning resolution. The present invention is applied in optics input equipments, such as scanners and multi-function peripherals. The scanning method projects a light to an original to produce a first image and then focuses the first image with a magnification M to generate a second image. The second image is reflected from reflectors to the scanning module to process the scanning. The resolution of the image scanned by the scanning module is M times of a native resolution of the scanning module.

7 Claims, 7 Drawing Sheets

METHOD AND APPARATUS FOR INCREASING SCANNING RESOLUTION

This application claims priority of Taiwan Patent Application Serial No.091100160 filed on Jan. 8, 2002.

FIELD OF INVENTION

The present invention relates to a method and apparatus for scanning, and more particularly, to a method and apparatus capable of increasing a native scanning resolution

BACKGROUND OF THE INVENTION

The typical optical scanner devices, such as well-known flat bed scanners, produce machine-readable image data from an original. The original could be a document, a photograph, or a transparency. For further computer applications, many users often transform the retrieved image data into a digital format and then output them to proper devices, such as monitors or printers. When the image data are transferred to a computer, users could edit, copy, and save them in accordance with their own preferences.

To meet needs for further image processing, it is desirable for users to adjust a resolution of a scanner. The resolution of the scanner means the number of pixels per unit length of the image data scanned from an original. If a coarse representation of the original can be accepted, users may reduce the amount of the scanned image data by selecting a low resolution. On the contrary, if a fine representation of the original is required for some applications, selecting a low resolution will not fulfill the quality requirement of applications Therefore, if users need a delicate image, a high resolution resulting in a large number of digital data is needed.

However, the resolution of the scanner usually is limited by the precision of an optical device, which could be influenced by manufacture techniques of a charge coupled device (CCD) or a contact image sensor (CIS) in the optical device.

As for current scanners, high resolution optical scanners have been proposed which are generally of a high cost due to the electro-optic transducers, known as CCDs, required for high resolution.

Alternatively, the effective resolution may be increased over the native resolution by using various data interpolation techniques For example, some data interpolation techniques can be used to increase the effective resolution to 600 or even 1200 dpi with a charge coupled device (CCD) having a native resolutions of only 300 dpi.

While the techniques described above are useful in increasing the effective resolution, they accompany disadvantages. For example, the interpolation techniques used to increase the resolution may require a substantial amount of processor time and/or memory, requiring more time to perform the scan operation. Or, it requires a faster processor and/or more memory if higher resolution is to be achieved without adversely affecting the overall scan time.

FIG. 1 shows a schematic diagram of a scanning apparatus for scanning a reflective original according to the prior art The scanning apparatus of the prior art includes a light source 11 and a scanning module 13

As shown in FIG. 1, an original 10 is placed on an image plane 12 of a scanning module 13. The original 10 is a reflective document. The light source 11 illuminates the original 10 and produces an image. The image is projected to the scanning module 13. The scanning module 13 receives the image to process the scanning. Here, the resolution of the image depends on the scanning module 13 If the resolution of scanning module 13 is high, a high quality image is obtained. However, if the resolution of scanning module 13 is low, instead, a coarse image with a restricted resolution is obtained.

FIG. 2 shows a schematic diagram of a scanning apparatus for scanning a transparent original according to the prior art. The scanning apparatus of the prior art includes a light source 21 and a scanning module 13.

As shown in FIG. 2, an original 20 is placed on an image plane 12 of a scanning module 13. The original 20 is a transparent document. The light source 21 illuminates the original 20 and produces an image. The image is projected to the scanning module 13. The scanning module 13 receives and processes the scanning. Here, the resolution of the image also depends on the scanning module 13

Additionally, in the scanning apparatus of the prior art, the original is placed on the image plane 12. Thus, the scanning apparatus precisely focuses on the surface of glass platform of the image plane 12. However, the positive original usually has a noticeable thickness. Therefore, when scanning the positive original, the obtained image will not be sharp due to out-of-focus resulting from unexpected thickness.

As a result, a scanning apparatus not limited by resolution of scanning module is desired. Besides, it is also important to avoid out-of-focus issue mentioned above.

SUMMARY OF THE INVENTION

The aspect of the present invention is to provide a method and apparatus for increasing an effective resolution of a scanning module.

Another aspect of the present invention is to provide a method and apparatus which avoids out-of-focus drawback due to the thickness of the positive original during scanning.

In the present invention, a light is projected to an original to produce a first image. The first image then is focused with a magnification M to generate a second image The second image is reflected from reflectors to the scanning module to process the scanning. The image resolution obtained is M times of a native resolution of the scanning module.

The scanning apparatus of the present invention includes a light source, a lens, at least a reflector, and a scanning module. The light source is used for projecting a light to illuminate an original to produce a first image. The lens focuses on the first image with a magnification M to generate a second image. The reflector reflects the second image. The scanning module receives the second image to process the scanning.

Additional objects and advantages of the invention will be set forth in the description which follows, and in part will be obvious from the description, or may be learned by practice of the invention.

DETAILED DESCRIPTION OF THE INVENTION

Figure 1:
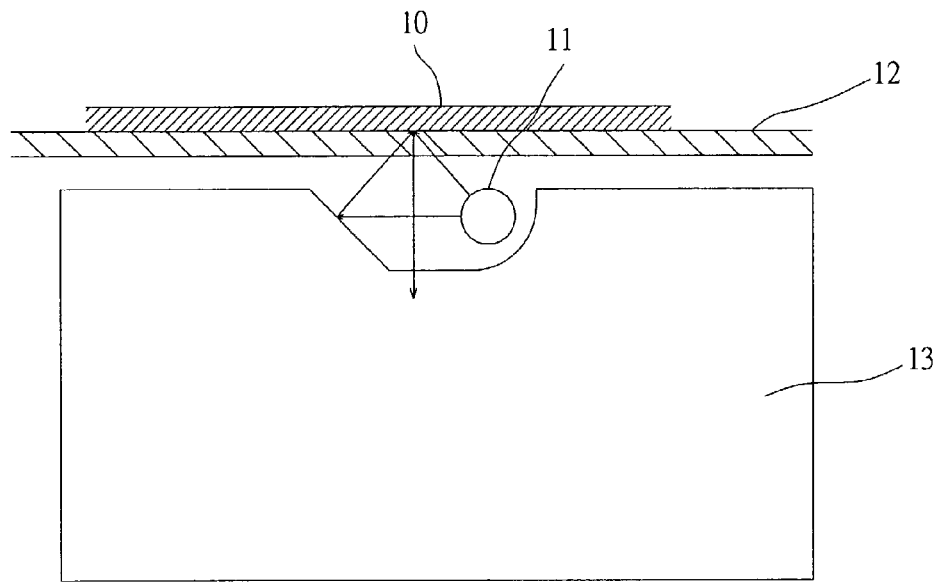
FIG. 1 shows a schematic diagram of a scanning apparatus for scanning a reflective original according to the prior art.
Figure 2:
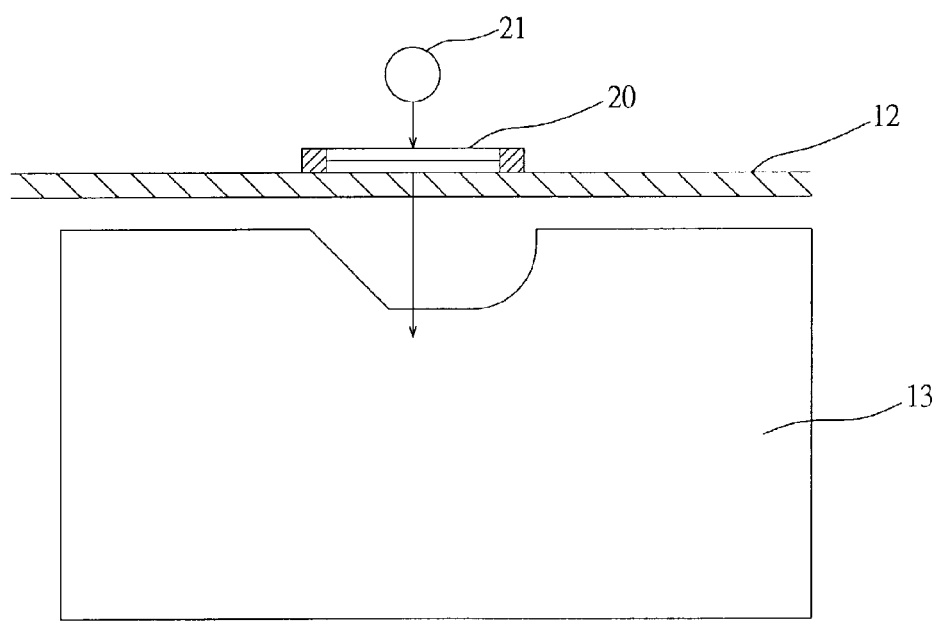
FIG. 2 shows a schematic diagram of a scanning apparatus for scanning a transparent original according to the prior art.
Figure 3:
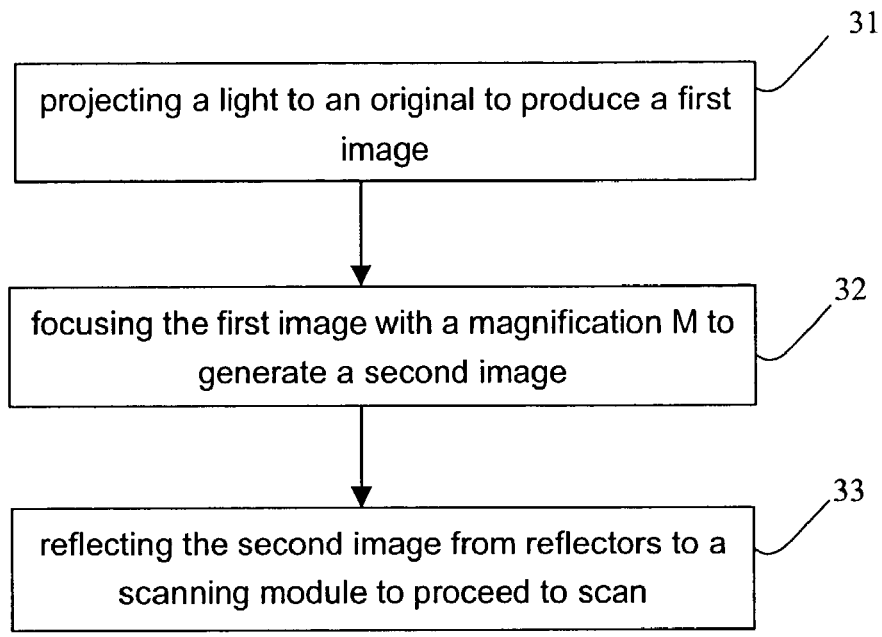
FIG. 3 shows a schematic flowchart of a scanning method according to an exemplary embodiment of the present invention.

The method and apparatus of the present invention could be applied to typical optical devices, such as scanners, multi-function peripherals, and so forth FIG. 3 shows a schematic flowchart of a scanning method according to an exemplary embodiment of the present invention In the embodiment, the present invention includes the step 31 to the step 33.

In the step 31, a light is projected to an original to produce a first image. In the step 32, the first image is focused with a magnification M to generate a second image. In the step 33, the second image is reflected from at least a reflector onto an image plane of a scanning module. The scanning module receives the second image on the image plane to process the scanning.

After magnification, the resolution of the image scanned by the scanning module is M times of a native resolution of the scanning module. Furthermore, in the method of the present invention, the original is positioned tightly in a slot for accurate focus. Therefore, the image can be reflected onto the image plane precisely and the scanning, module receives a clear image. The original could be a reflective original, such as a document, a photo, or a transparent original, such as a positive, a negative. The scanning module includes a charge-coupled device (CCD).

Figure 4:
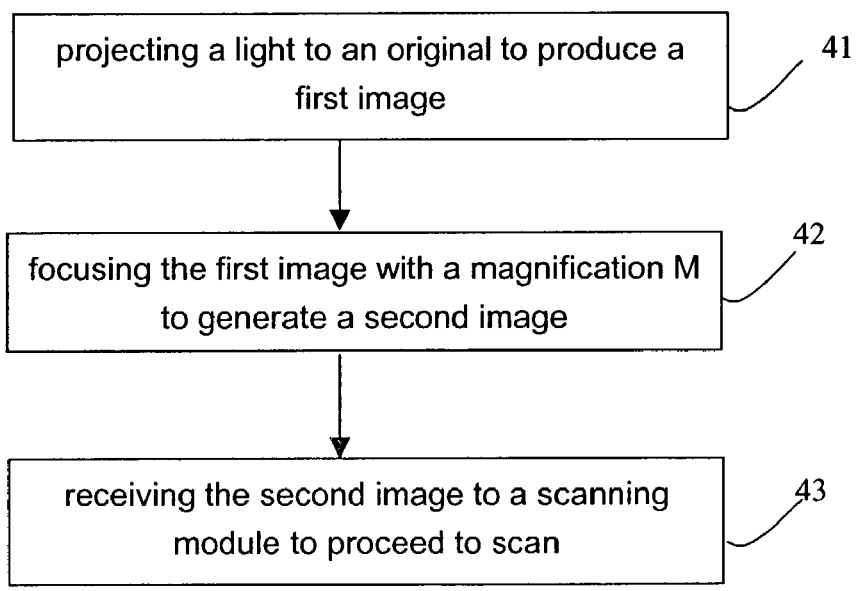
FIG. 4 shows a schematic flowchart of a scanning method according to another exemplary embodiment of the present invention.

FIG. 4 shows a schematic flowchart of a scanning method according to another exemplary embodiment of the present invention. In the embodiment, the present invention includes the step 41 to the step 43.

In the step 41, a light is projected to an original to obtain a first image. In the step 42, the first image is focused with a magnification M to generate a second image. The Second image is projected onto an image plane of a scanning module In the step 43, the scanning module receives the second image to process the scanning.

After magnification, the resolution of the image scanned by the scanning module is M times of a native resolution of the scanning module.

Furthermore, in the method of the present invention, the original is positioned tightly in a slot for accurate focus. Therefore, the image can be projected onto the image plane precisely and the scanning module receives a clear image. The original could be a reflective original, such as a document or a picture, and a transparent original, such as a positive, or a negative. The scanning module includes a charge-coupled device (CCD).

Figure 5:
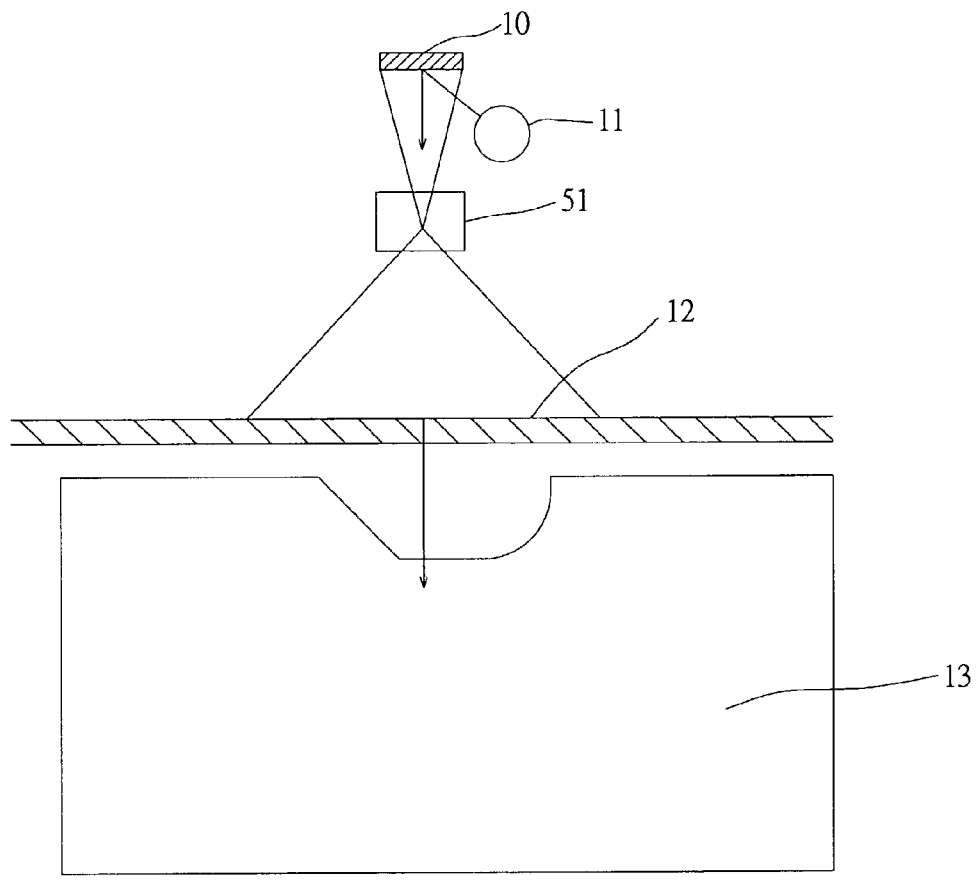
FIG. 5 shows a schematic diagram of a scanning apparatus for scanning a reflective original according to an exemplary embodiment of the present invention

FIG. 5 shows a schematic drawing of a scanning apparatus according to an exemplary embodiment for scanning a reflective original of the present invention. The scanning apparatus includes a light source 11, a lens 51, and a scanning module 13. An original 10 could be a reflective original, such as an image, a photo, or a document.

First, the light source 11 illuminates the original 10 for reflecting a light to produce a first image. The first image then is projected to the lens 51. The lens 51 focuses the first image with a magnification M to generate a second image. The second image is projected onto an image plane 12 The scanning module 13 receives the second image on the image plane 12 to process the scanning.

After magnification by the lens 51, the resolution of the image scanned by the scanning module 13 is M times of a native resolution of the scanning module 13.

Figure 6:
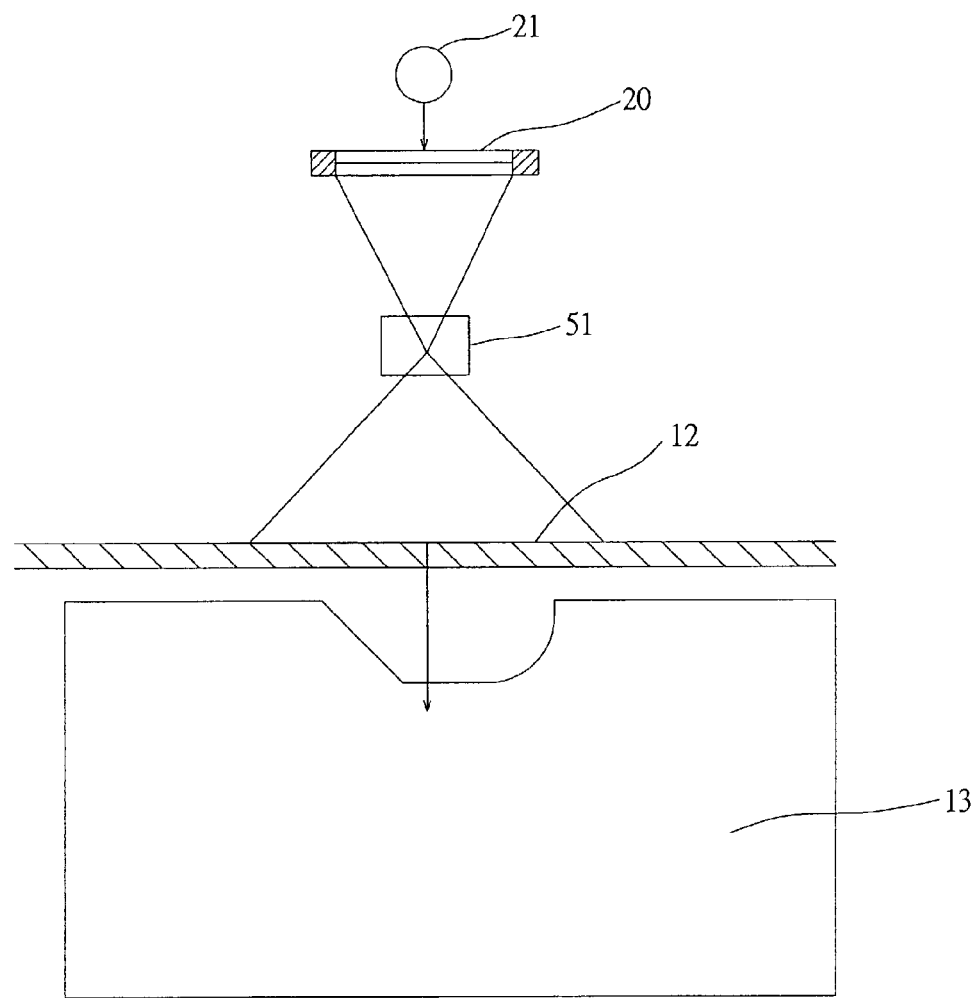
FIG. 6 shows a schematic diagram of a scanning apparatus for scanning, a transparent original according to an exemplary embodiment of the present invention.

FIG. 6 shows a schematic drawing of a scanning apparatus according to an exemplary embodiment for scanning a transparent original of the present invention. The scanning apparatus includes a light source 21, a lens 51, and a scanning module 13. An original 20 could be a positive, a negative, or a slide.

First, the light source 21 illuminates the original 20 for projecting a light to produce a first image The first image then is projected to the lens 51. The lens 51 focuses the first image with a magnification M to generate a second image. The second image is projected onto an image plane 12 of the scanning module 13 The scanning module 13 receives the second image on the image plane 12 to process the scanning.

After magnification by the lens 51, the resolution of the image scanned by the scanning module 13 is M times of a native resolution of the scanning module 13.

Furthermore, in the method of the present invention, the original 20 is positioned tightly in a slot (not shown) for accurate focus. Since the original 20, such as a positive, is not placed on the image plane 12, the image can be projected onto the image plane 12 precisely without concern about the thickness of the document 20. The scanning module 13 receives a clear image.

Figure 7:
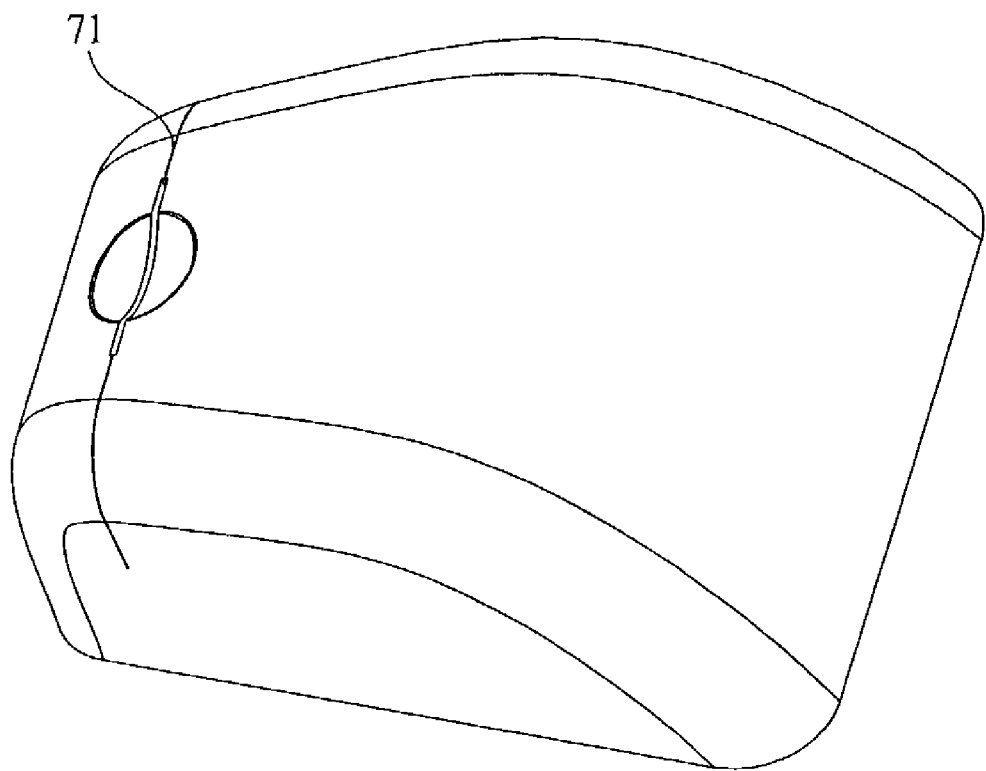
FIG. 7 shows a schematic top-view diagram of a scanning apparatus according to an exemplary embodiment of the present invention.

FIG. 7 shows a schematic top-view diagram of a scanning apparatus according to an exemplary embodiment of the present invention. The scanning apparatus includes a long slot 71 for placing original The slot 71 positions the originals tightly for accurate focus.

Figure 8:
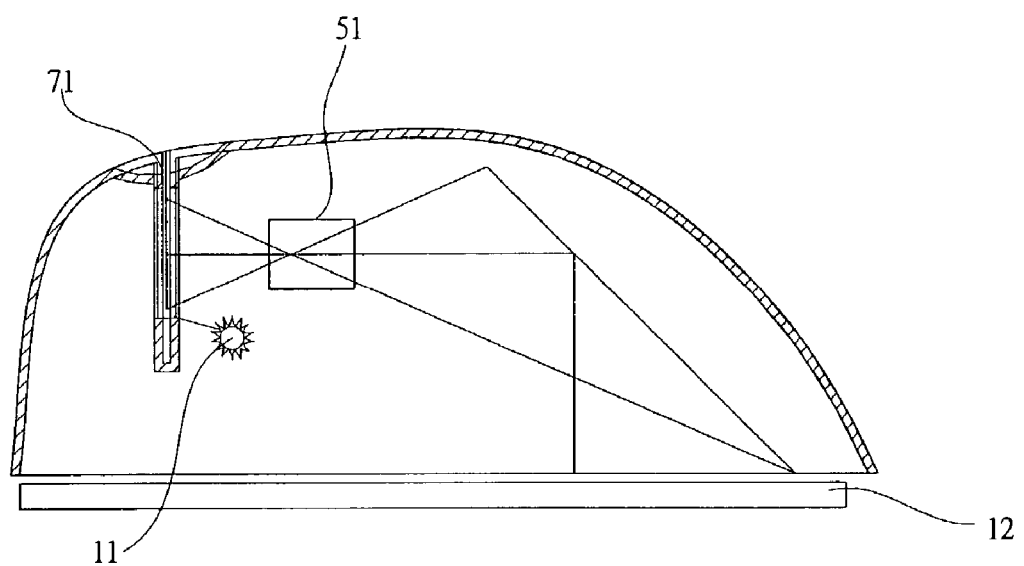
FIG. 8 shows a schematic diagram of a scanning apparatus for scanning a reflective original according to another exemplary embodiment of the present invention.

FIG. 8 shows a schematic diagram of a scanning apparatus for scanning a reflective original according to another exemplary embodiment of the present invention. The scanning apparatus includes a slot 71, a light source 11, a lens 51, and at least a mirror 80 and a scanning module (not shown).

First, the original (not shown) is positioned in the slot 71. The original is a reflective original, such as an image, a photo or a document. The light source 11 illuminates the original for reflecting a light to produce a first image (e.g. L1, L2 and L3). The first image then is projected to the lens 51. The lens 51 focuses the first image with a magnification M to generate a second image The second image is reflected from the mirror 80 onto an image plane 12 of the scanning module 13. The scanning module 13 receives the second image on the image plane 12 (e.g. L1', L2' and L3') to process the scanning.

Additionally, the original is positioned tightly in the slot 71 for accurate focus After magnification M by the lens 51, the resolution of the image scanned by the scanning module 13 is M times of a native resolution of the scanning module 13 Therefore, the present invention substantially increases the effective resolution of the scanning module 13.

Figure 9:
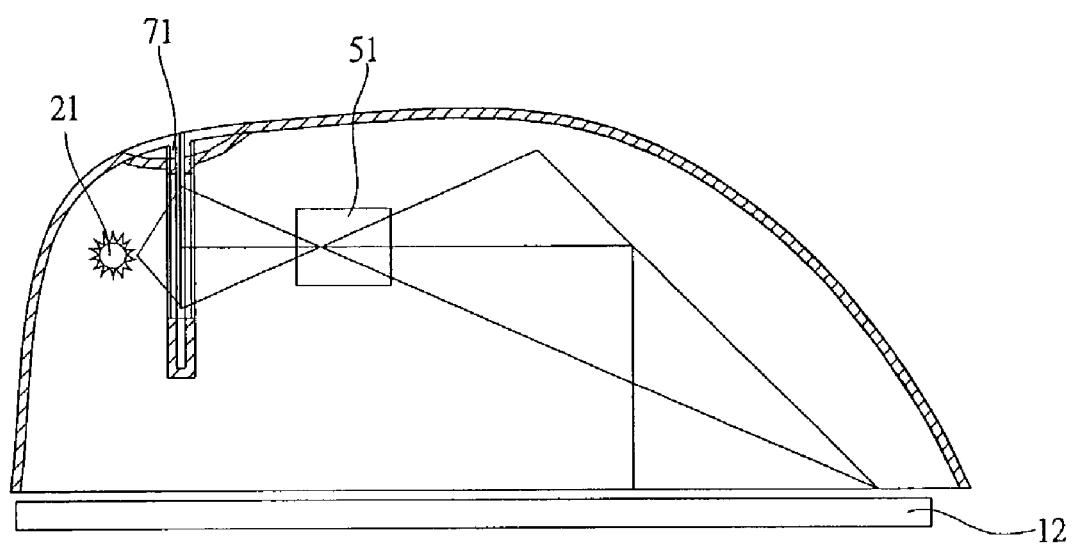
FIG. 9 shows a schematic diagram of a scanning apparatus for scanning a transparent original according to another exemplary embodiment of the present invention

FIG. 9 shows a schematic diagram of a scanning apparatus for scanning a transparent original according to another exemplary embodiment of the present invention. The scanning apparatus includes a slot 71, a light source 21, a lens 51, and at least a mirror 80 and a scanning module (not shown).

First, the original (not shown) is positioned in the slot 71. The original is a transparency, such as a positive, a negative, or a slide. The light source 21 illuminates the original for projecting a light to produce a first image (e.g. L1, L2 and L3). The first image then is projected to the lens 51. The lens 51 focuses the first image with a magnification M to generate a second image (e.g. L1', L2' and L3'). The second image is reflected from the mirror 80 onto an image plane 12 of the scanning module 13. The scanning module 13 receives the second image on the image plane 12 to process the scanning.

Additionally, the original is positioned tightly in the slot 71 for accurate focus. After magnification M by the lens 51, the resolution of the image scanned by the scanning module 13 is M times of a native resolution of the scanning module 13. Therefore, the present invention substantially increases the effective resolution of the scanning module 13.

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense Thus, it is intended that the present invention covers the modification and variations of this invention provided they come within the scope of the appended claims and then equivalents

What is claimed is:

1. A scanning apparatus, comprising:
a scanning module provided with an image plane;
a light source for projecting a light to illuminate an original to produce a first image; and
a lens for magnifying said first image to generate a second image on said image plane;
wherein said scanning module processes a scanning of said second image, and said original is a reflective original.

2. The scanning apparatus as set forth in claim 1, wherein a resolution of said scanning apparatus is M times of a resolution of said scanning module.

3. A scanning apparatus, comprising:
a scanning module provided with an image plane;
a light source for projecting a light to illuminate an original to produce a first image;
a lens for magnifying said first image to generate a second image; and
at least a reflector for reflecting said second image on said image plane;
wherein said scanning module processes a scanning of said reflected second image, and
said original is a reflective original.

4. The scanning apparatus as set forth in claim 3, wherein a resolution of said scanning apparatus is M times of a resolution of said scanning module.

5. The scanning apparatus as set forth in claim 3, further comprising a housing and a slot located on an upper surface of said housing, wherein said original is positioned in said slot and said slot is arranged relative to said reflector for directing said second image to said image plane.

6. A scanner, comprising:
a scanning module provided with an image plane;
a light source for projecting a light to illuminate an original to produce a first image; and
a lens for magnifying said first image to generate a second image on said image plane;
wherein said scanning module processes a scanning of said second image, and
said original is a reflective original.

7. The scanner as set forth in claim 6, further comprising at least a reflector, a housing and a slot, wherein said slot is located on an upper surface of said housing, said original is positioned in said slot and said slot is arranged relative to said at least a reflector for directing said second image to said image plane.

* * * * *